United States Patent
Hashimoto

(10) Patent No.: US 10,162,695 B2
(45) Date of Patent: Dec. 25, 2018

(54) INFORMATION PROCESSING APPARATUS AND FAULT DIAGNOSIS METHOD

(71) Applicant: CANON KABUSHIKI KAISHA, Tokyo (JP)

(72) Inventor: Minoru Hashimoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/741,922

(22) Filed: Jun. 17, 2015

(65) Prior Publication Data

US 2015/0370624 A1    Dec. 24, 2015

(30) Foreign Application Priority Data

Jun. 19, 2014   (JP) ................................ 2014-126497

(51) Int. Cl.
   *G06F 11/07*   (2006.01)
(52) U.S. Cl.
   CPC ...... *G06F 11/0772* (2013.01); *G06F 11/0733* (2013.01); *G06F 11/0757* (2013.01)
(58) Field of Classification Search
   CPC combination set(s) only.
   See application file for complete search history.

(56) References Cited

U.S. PATENT DOCUMENTS

| | | | | |
|---|---|---|---|---|
| 5,278,765 A * | 1/1994 | Oomori | ............. | G05B 19/4184 347/4 |
| 9,071,079 B2 * | 6/2015 | Liu | ........................ | H02J 1/102 |
| 2007/0274112 A1 * | 11/2007 | Lalithambika | .... | H02M 3/33523 363/74 |
| 2010/0270988 A1 * | 10/2010 | De Cremoux | ...... | H02M 3/1582 323/282 |
| 2011/0007337 A1 * | 1/2011 | Imazeki | ................. | G03G 15/55 358/1.14 |
| 2013/0222831 A1 * | 8/2013 | Konosu | .............. | H04N 1/00835 358/1.13 |
| 2014/0063528 A1 * | 3/2014 | Hirose | ............... | H04N 1/00323 358/1.13 |
| 2014/0266293 A1 * | 9/2014 | Ye | .......................... | G01R 31/40 324/764.01 |
| 2016/0105581 A1 * | 4/2016 | Hikichi | .............. | H04N 1/00891 358/1.14 |

FOREIGN PATENT DOCUMENTS

| | | |
|---|---|---|
| JP | 05-002654 A | 1/1993 |
| JP | 2005-025309 A | 1/2005 |
| JP | 2008-073918 A | 4/2008 |

* cited by examiner

*Primary Examiner* — Amine Riad

(74) *Attorney, Agent, or Firm* — Canon USA, Inc. I.P. Division

(57) ABSTRACT

An information processing apparatus and a fault diagnosis method for monitoring signals relating to the start of a CPU to determine that a failure occurs, in a case where a predetermined signal is not output within a predetermined time period after the output of a predetermined signal, and determine the failure type based on the signal states at the time of the occurrence of the failure to display information corresponding to the failure type.

15 Claims, 11 Drawing Sheets

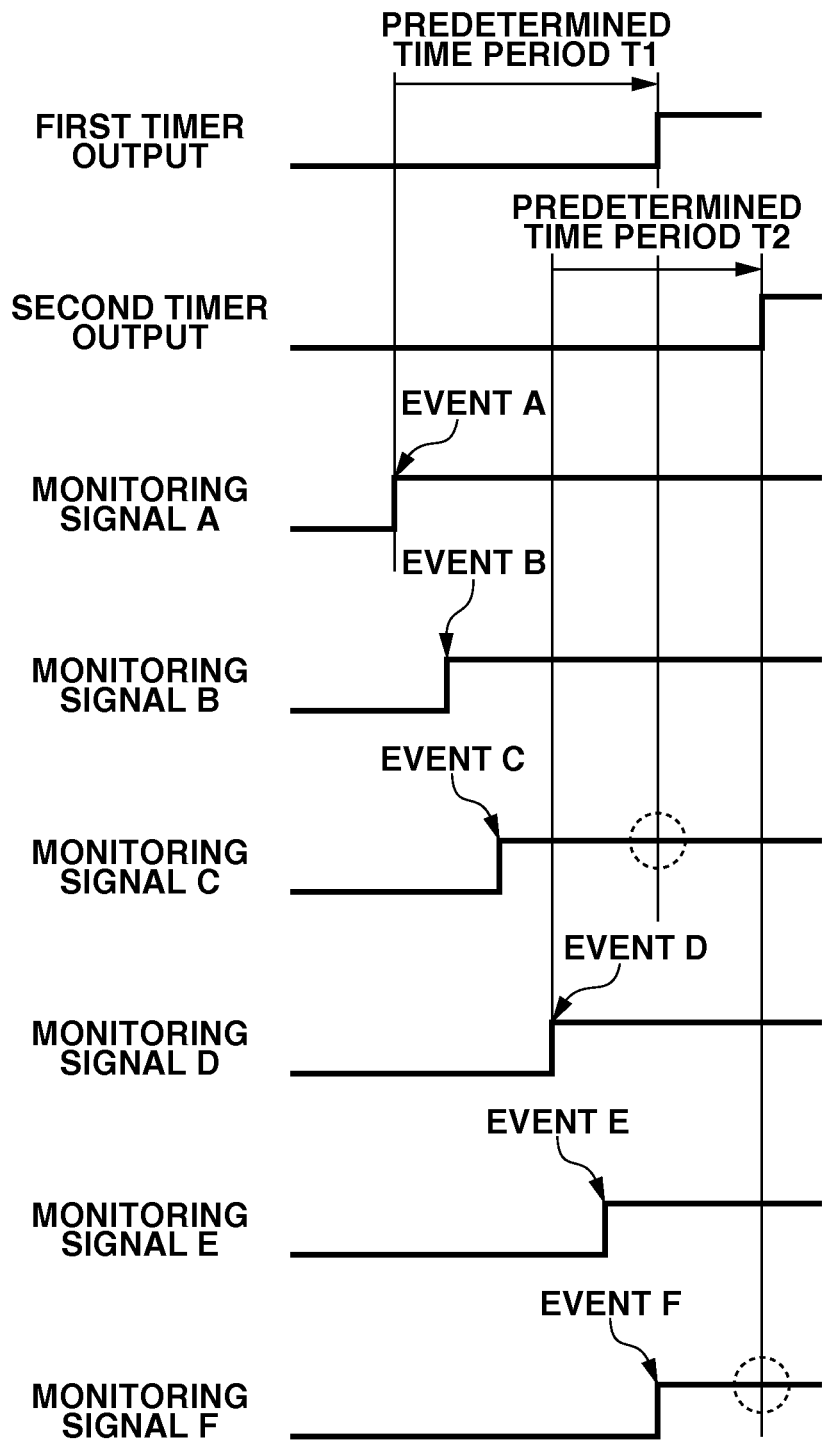

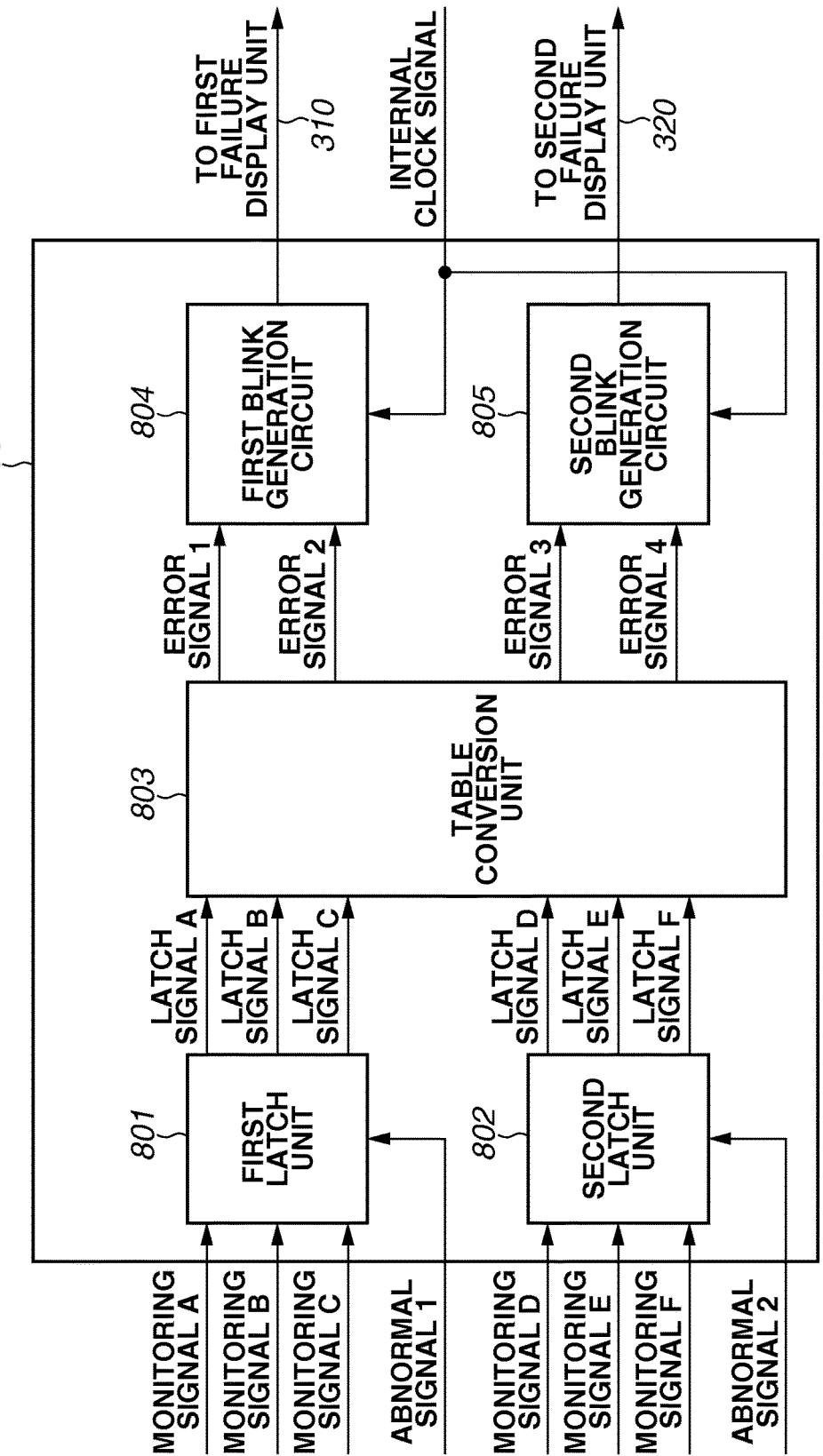

FIG.9A

| LATCH SIGNAL A | LATCH SIGNAL B | LATCH SIGNAL C | ERROR SIGNAL 1 | ERROR SIGNAL 2 | FAILURE DISPLAY SIGNAL 1 |
|---|---|---|---|---|---|
| ACTIVE | INACTIVE | Don't Care | ACTIVE | INACTIVE | BLINK PATTERN 1 |
| ACTIVE | ACTIVE | INACTIVE | INACTIVE | ACTIVE | BLINK PATTERN 2 |
| OTHER THAN THOSE ABOVE ||| INACTIVE | INACTIVE | TURN OFF LIGHT |

FIG.9B

| LATCH SIGNAL D | LATCH SIGNAL E | LATCH SIGNAL F | ERROR SIGNAL 3 | ERROR SIGNAL 4 | FAILURE DISPLAY SIGNAL 2 |
|---|---|---|---|---|---|
| ACTIVE | INACTIVE | Don't Care | ACTIVE | INACTIVE | BLINK PATTERN 3 |
| ACTIVE | ACTIVE | INACTIVE | INACTIVE | ACTIVE | BLINK PATTERN 4 |
| OTHER THAN THOSE ABOVE ||| INACTIVE | INACTIVE | TURN OFF LIGHT |

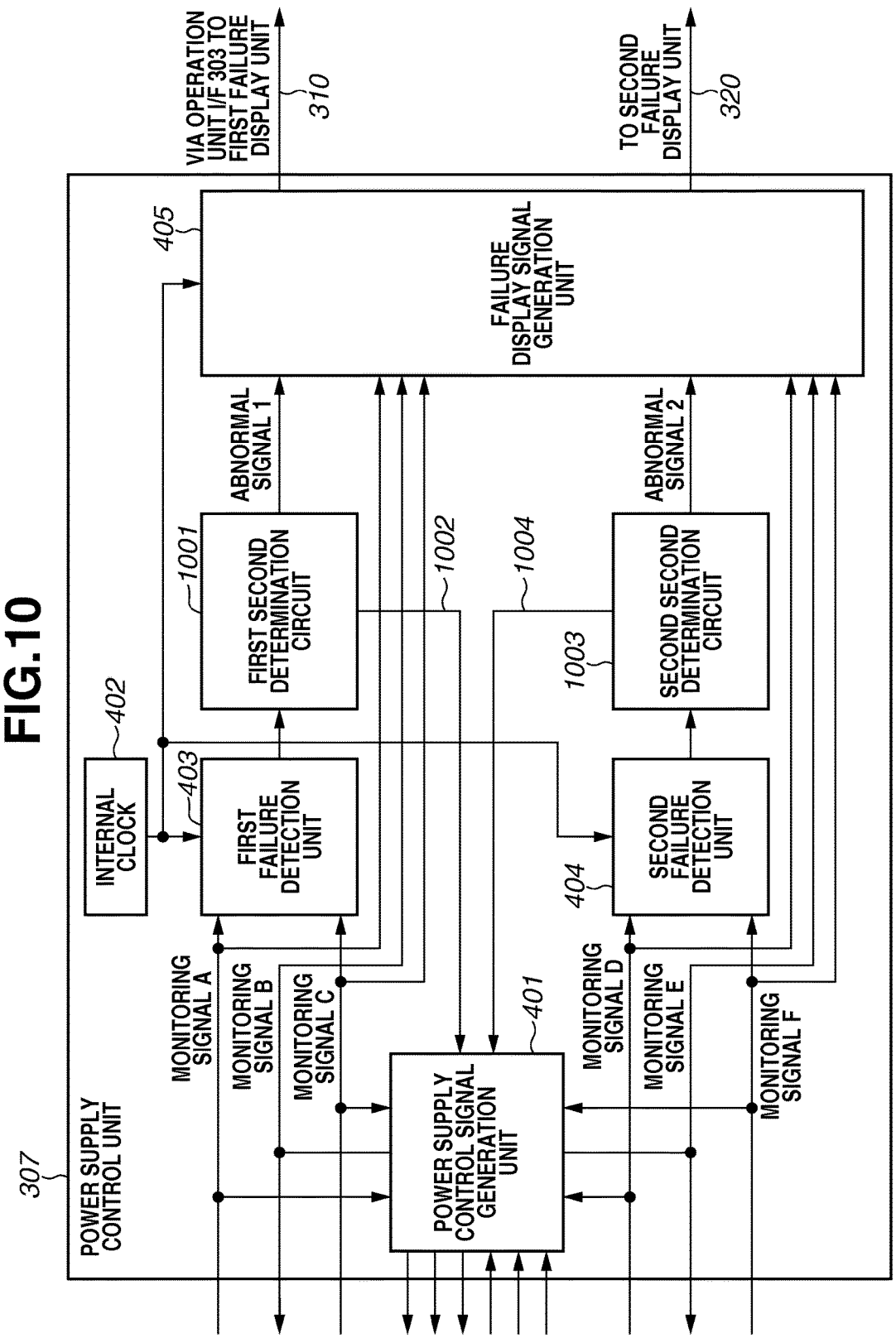

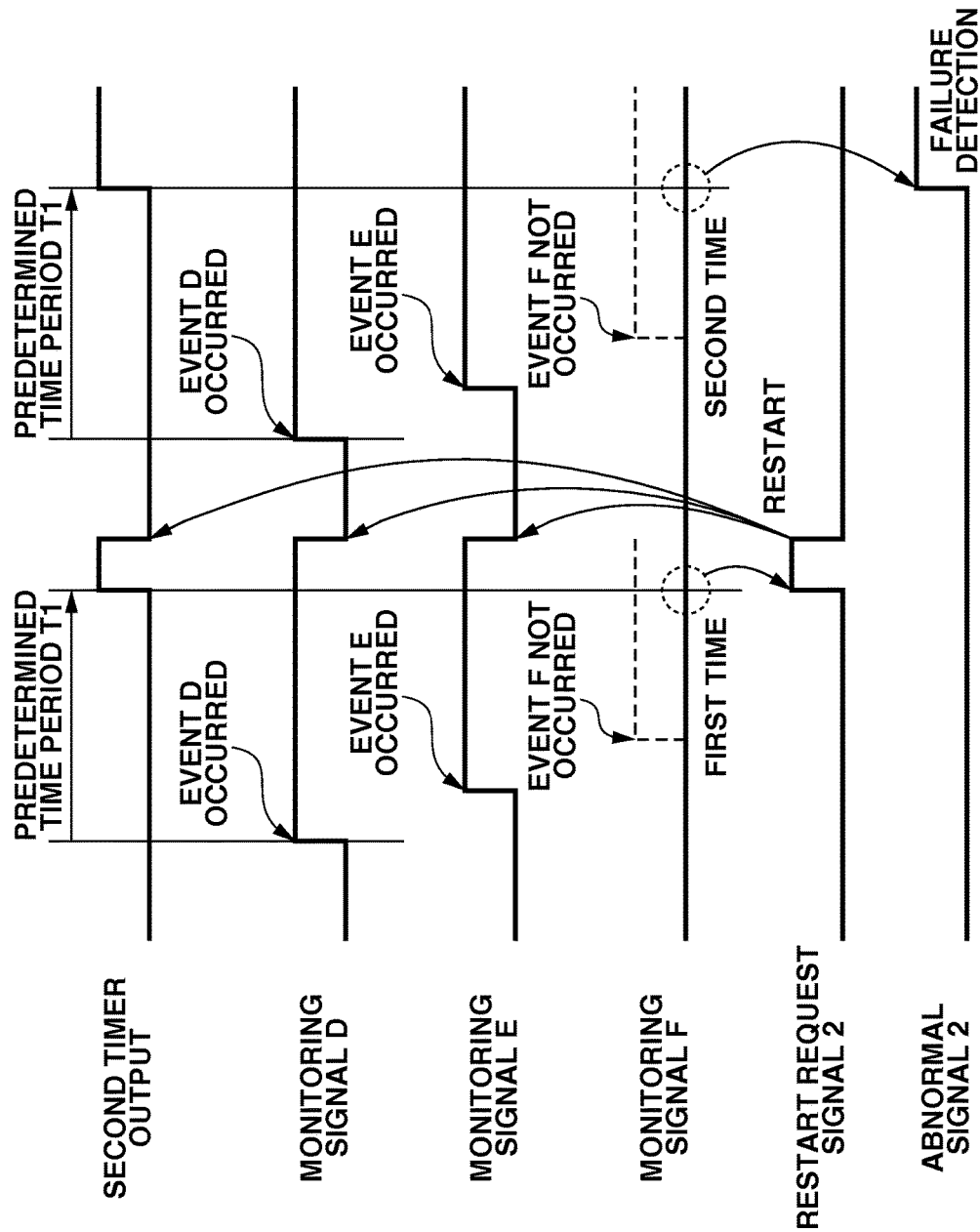

INFORMATION PROCESSING APPARATUS AND FAULT DIAGNOSIS METHOD

BACKGROUND OF THE INVENTION

Field of the Invention

The present invention relates to an information processing apparatus and a fault diagnosis method. More particularly, the present invention relates to an information processing apparatus and a fault diagnosis method for diagnosing the location of a failure and selectively displaying the types of the failure even when a central processing unit (CPU) fails to start.

Description of the Related Art

In the event of trouble in an information processing apparatus such as a multi-functional peripheral (MFP) having functions of a copy machine, a printer, and a scanner, a service staff visits a user site to directly look into the apparatus and repairs the apparatus. In a case of a failure in starting a CPU that controls the entire information processing apparatus, the CPU cannot detect the failure or display the location of the failure. In such a case, the service staff has to do a lot of work to locate a failure spot since there is a possibility that the failure occurs in a wide range, for example, in a power supply, wiring, printed circuit boards (PCB), and data in a non-volatile memory.

Further, it is more difficult to locate the failure spot on the printed circuit board because a plurality of power supply circuits, a clock, and a reset signal generation circuit or the like are provided on the printed circuit board.

As known techniques, for example, Japanese Patent Application Laid-Open No. 05-02654 discusses an information processing apparatus having an additional circuit for failure detection, the circuit being designed to operate separately from a CPU to immediately detect the failure spot during the operation of the CPU.

SUMMARY OF THE INVENTION

In an information processing apparatus having the additional failure detection circuit as above described, when the CPU fails to start normally, the power supply, the clock, the reset signal, and other components are not set to a predetermined state. Consequently, the failure detection circuit cannot operate and fails to function. The present invention is directed to provide a fault diagnosis apparatus capable of detecting a failure, locating the failure spot, and displaying the failure even when the CPU fails to start normally.

According to an aspect of the present invention, an information processing apparatus configured to be controlled by a central processing unit (CPU) is provided. The information processing apparatus includes a failure detection unit configured to receive a plurality of monitoring signals sequentially generated in response to power supply and operation to start the CPU, and output an abnormal signal in a case where the failure detection unit does not detect a change in a second monitoring signal within a predetermined time period after having detected a change in a first monitoring signal among the plurality of monitoring signals, output an abnormal signal, a signal generation unit configured to output a failure display signal indicating a type of failure based on the monitoring signals if the abnormal signal is input, and a display unit configured to display the failure information based on the failure display signal.

Further features of the present invention will become apparent from the following description of exemplary embodiments with reference to the attached drawings.

BRIEF DESCRIPTION OF THE DRAWINGS

FIG. 6 illustrates an example of signal waveforms relating to the failure detection unit.

FIG. 8 is a block diagram illustrating a configuration of the failure display signal generation unit in the power supply control unit.

FIG. 9A and FIG. 9B are tables illustrating combinations of signals in a failure display unit.

FIG. 10 is a block diagram illustrating another configuration of the power supply control unit according to an exemplary embodiment of the present invention.

FIG. 11 illustrates another example of signal waveforms relating to the failure detection unit.

DESCRIPTION OF THE EMBODIMENTS

Hereinafter, exemplary embodiments of the present invention will be described with reference to the accompanied drawings.

Figure 1:
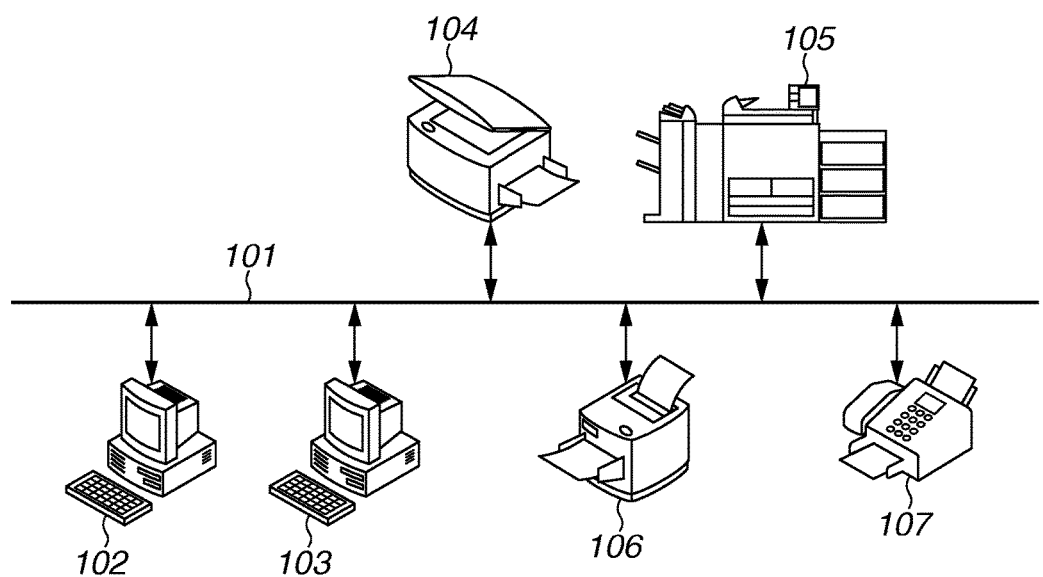
FIG. 1 illustrates an example of a system configuration.

In the description below, a fault diagnosis apparatus according to the exemplary embodiments of the present invention is applied to an information processing apparatus as an example. FIG. 1 illustrates an example of a configuration of a system employing the information processing apparatus to which the exemplary embodiments of the present invention are applied.

The information processing apparatus according to the exemplary embodiments of the present invention may include image forming apparatuses, for example, a printer, and a multi-functional peripheral (MFP) having various functions such as a copy function, a scanning function, a facsimile function, and a print function. Such information processing apparatuses are connected with each other via a network 101, so that the apparatuses can transmit and receive data to and from the other apparatuses. In FIG. 1, a MFP 105 is connected with personal computers (PCs) 102 and 103, scanner printers 104 and 106, and a facsimile 107 via the network 101. While Ethernet (registered trademark) is used for the network as an example, the exemplary embodiments of the present invention do not depend on the network system, and can be applied to other network systems.

Figure 2:
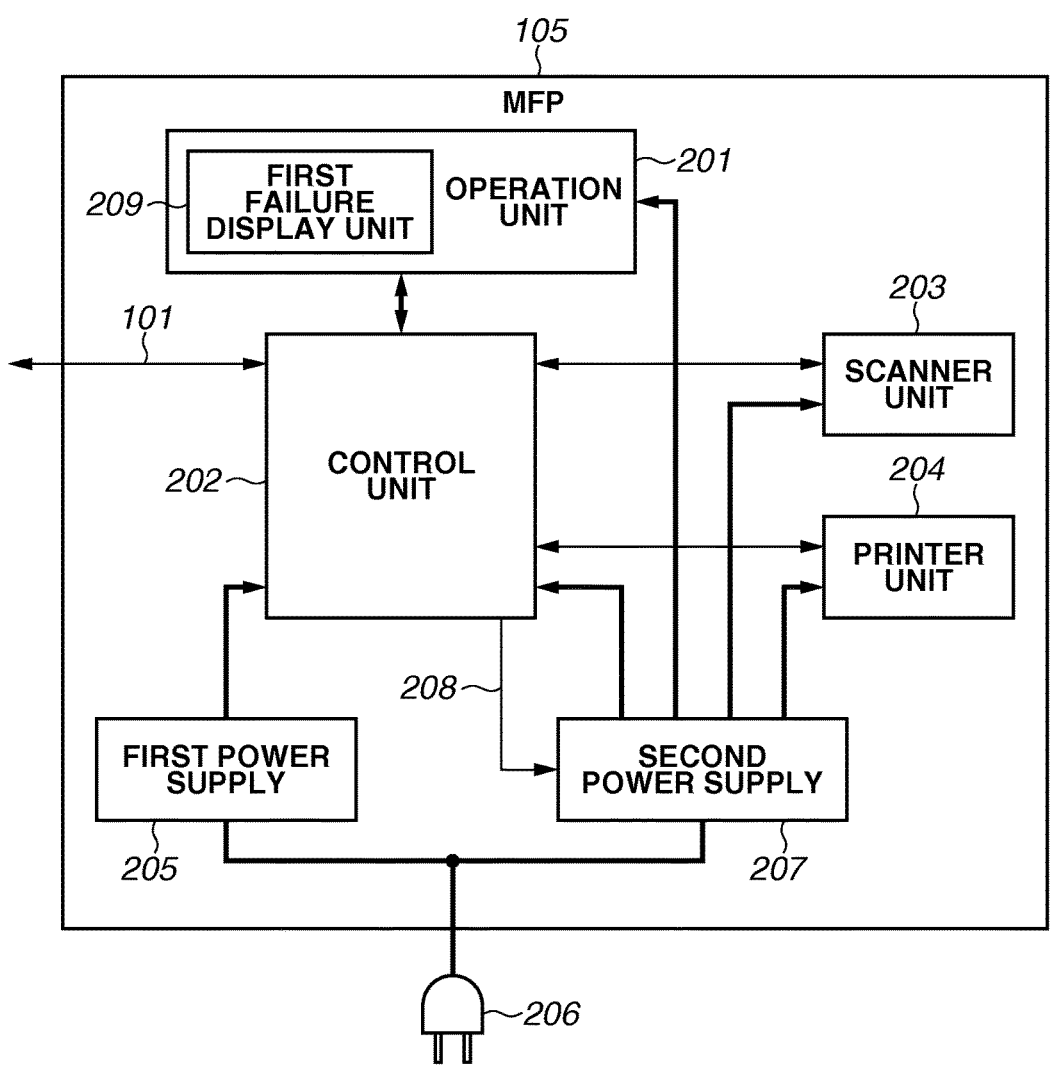
FIG. 2 is a block diagram illustrating an example of an internal configuration of an information processing apparatus.

FIG. 2 is a block diagram illustrating an internal configuration of the MFP 105 that is an information processing apparatus capable of performing self-diagnosis processing for locating a failure, to which the exemplary embodiments of the present invention is applied.

A control unit 202 is a component for controlling the operation of the MFP 105. The control unit 202 transmits and receives data, converts and stores data, and performs power control.

For example, in the case of printing operation of the MFP 105, job data is generated in the PC 102, which is connected via the network. The data is transferred via the network 101 to the control unit 202, and is temporarily stored. The control unit 202 converts the stored job data into image data and transfers the data to a printer unit 204. Under the control of the control unit 202, the printer unit 204 prints the image data on recording paper, and discharges the paper outside the apparatus.

In the case of scanning operation of the MFP 105, after a user sets an original document on a scanner unit 203, the user operates buttons while referring to a screen on the operation unit 201 to perform scanning operation setting and then to instruct operation start. Under the control of the control unit 202, the scanner unit 203 optically reads the original document and converts the data into image data. The image data is temporarily stored in the control unit 202, and is transferred to a sending destination specified with the operation unit 201 in advance.

In the case of copying operation of the MFP 105, after the user sets an original document on the scanner unit 203, the user operates buttons while referring to a screen on the operation unit 201 to set detailed copying operation settings and then to instruct copying operation start. Under the control of the control unit 202, the scanner unit 203 optically reads the original document and converts the data into image data. The obtained image data is temporarily stored in the control unit 202. Subsequently, under the control of the control unit 202, the data format of the data is converted into a data format usable in the printer unit 204 and is transferred to the printer unit 204. The printer unit 204 then prints the image data on recording paper and discharges it outside the apparatus.

A first power supply 205 and a second power supply 207 convert commercial alternating current power supply fed from a power plug 206 into direct current voltage to be used in the individual units in the MFP 105. The power supply output from the second power supply 207 is controlled by a power supply control signal 208 output from the control unit 202. The second power supply 207 is turned on in a normal mode and is turned off in a power-saving mode.

Here, the power-saving mode indicates a state in which the power supply to components other than the control unit 202 is stopped to reduce the power consumption of the commercial power supply, when no job processing is performed in the information processing apparatus.

The control unit 202 can detect reception of a job in the power-saving mode. In response to the job detection, the unit 202 immediately switches the power supply control signal 208 to turn on the second power supply 207, and enters the normal mode.

Figure 3:
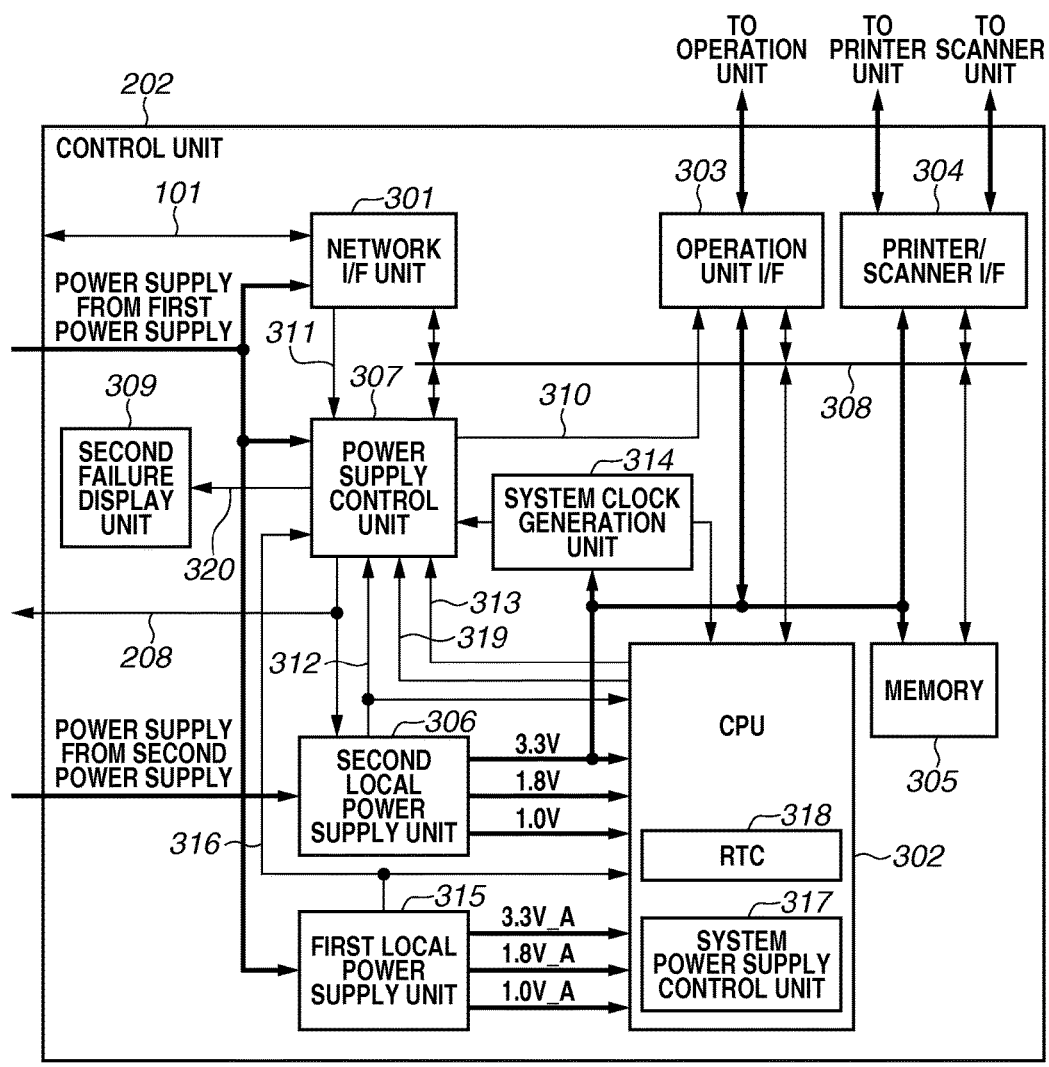
FIG. 3 is a block diagram illustrating a configuration of the control unit in the information processing apparatus.

FIG. 3 is a block diagram illustrating a configuration of the control unit 202 within the information processing apparatus.

A CPU 302 that controls the control unit 202 is connected via an internal bus 308 with a network I/F unit 301, which performs network communication, an operation unit I/F 303, which communicates with the operating unit 201, a printer/scanner I/F 304, which communicates with the scanner unit 203 and the printer unit 204, a power supply control unit 307, and a memory 305 to be used during an operation time.

When the MFP 105 is turned on and started from a power-off state, the first power supply 205 is turned on, and the power supply control unit 307 and the network I/F unit 301 start to operate. With the power supply from the first power supply 205, a first local power supply unit 315 is also turned on, and a power supply control clock RTC 318 provided in the CPU 302 starts to operate.

When the power supply control clock RTC 318 starts to operate, a power supply clock signal 319 is output. The power supply clock signal 319 is supplied to the power supply control unit 307 to start the power supply control unit 307. In response to the start of the operation of the power supply control clock RTC 318, a system power supply control unit 317 provided in the CPU 302 starts to operate.

The system power supply control unit 317 performs control to switch the information processing apparatus between the power-saving mode and the normal mode. When the power supply is turned on, the system power supply control unit 317 outputs a power saving mode/normal mode switching signal 313 to switch the information processing apparatus into the normal mode.

The power supply control unit 307, at the timing a power supply clock signal 319 starts the oscillation and a power saving mode/normal mode switching signal 313 is output, switches and outputs the power supply control signal 208 to turn on the second power supply 207.

When the second power supply 207 is turned on, a second local power supply unit 306 to which electric power is supplied from the second power supply 207 is turned on, and the second local power supply unit 306 starts to output 3.3 V, 1.8 V, and 1.0 V. The 3.3 V output is supplied to the CPU 302, and the printer/scanner I/F unit 304, the operation unit 303, and the memory 305. The CPU 302 uses the 1.8 V output and the 1.0 V output in addition to the 3.3 V output.

The second local power supply unit 306 generates a second Power-Good signal 312 with a delay of about 100 milliseconds after the individual power outputs reach predetermined voltages. The signal is input to the power supply control unit 307 and the CPU 302.

The 3.3 V output from the second local power supply unit 306 is also supplied to a system clock generation unit 314, and a system clock starts the oscillation. The oscillation signal generated by the system clock is necessary for the CPU 302 to operate, so that the signal is output to the CPU.

According to the exemplary embodiments of the present invention, to enable failure detection, the same oscillation signal produced by the system clock that is output to the CPU 302 is also output to the power supply control unit 307. More specifically, the signal is utilized for the failure detection as one of a plurality of monitoring signals which are monitored by failure detection units 403 and 404 provided within the power supply control unit 307.

The CPU 302 receives the 3.3 V from the second local power supply unit 306, and in response to input of the second Power-Good signal 312, the CPU 302 starts to operate, reads a boot program from the memory 305, and executes the read program to perform a series of boot-up operations.

When the MFP 105 enters into the power-saving mode, the second power supply 207 is turned off according to the power supply control signal 208 output from the power supply control unit 307 under the control of the CPU 302.

In the power-saving mode, in the entire control unit 202, only the network I/F 301 and the power supply control unit 307 operate, both of which receive the power from the first power supply 205.

The network I/F 301 receives a packet via the network 101 and checks the content of the packet. If the packet requires processing, such as job data, that is, if the packet is a wake-up packet, the network I/f 301 outputs a network return trigger signal 311 to the power supply control unit 307. This signal is a trigger for changing the state of the MFP 105 from the power-saving mode to the normal mode.

The power supply control unit 307 outputs the power supply control signal 208 for switching the second power supply 207 to the on state in response to the reception of the network return trigger signal 311. When the second power supply 207 is turned on, similar to the above-described power supply state, the CPU 302 starts after a series of operations.

In the normal mode, if there is no job such as printing, copying, and faxing, and no user operation via the operation unit 201, the CPU 302 prompts the information processing apparatus to enter the power-saving mode to reduce unnecessary energy consumption.

The transition to the power-saving mode is carried out through a series of operations performed by the CPU 302. In the operations, the CPU 302 shuts down a currently running operating system (OS) program read by the CPU 302, performs processing for terminating the individual components, and turns off the second power supply 207 through an operation for switching the power supply control signal 208 output from the power supply control unit 307.

The power supply control unit 307 receives a power-saving mode/normal mode switching signal 313 output from the system power supply control unit 317 and a power supply control clock signal 319 output from the power supply control clock RTC 318 in the CPU 302. The power supply control unit 307 then outputs the power supply control signal 208 based on the input signals.

If the CPU fails to start, the function of the power supply control unit 307 is stopped in the middle of the processing. Consequently, a failure can be detected by monitoring the signals relating to the power supply control.

The failure detected by the power supply control unit 307 can be displayed on both of a first failure display unit 209 and a second failure display unit 309.

The first failure display unit 209 is used to inform the failure detection and is provided on the operation unit 201 which users and service staff can readily view from the outside of the apparatus. For users, since detailed information about the failure is not necessary, minimum information may be provided on the first failure display unit 209. However, information about a failure derived from the CPU 302 is not displayed on the first failure display unit 209 if the CPU 302 fails to start. This is because the CPU 302 controls the whole display screen of the operation unit 201 and presents the information on display. Consequently, when the failure is detected, it is necessary to generate a failure display signal in the power supply control unit 307, output the signal to the operation unit 201, and display the information about the failure on the first failure display unit 209 in the operation unit 201.

The second failure display unit 309 is disposed in the control unit 202 inside the casing of the apparatus to provide further detailed information. For example, the second failure display unit 309 is provided in the form of a liquid crystal display cell in a main circuit board of the control unit 202.

The second failure display unit 309 displays failure information, from which the service staff can identify the detailed contents of the failure such as a step at which the CPU 302 boot-up processing has stopped. Moreover, from the contents displayed on the second failure display unit 309, the service staff can locate the component which is not working in the apparatus when the CPU 302 has failed to start.

As described above, by providing the two failure display units, both of simple failure report and detailed failure type report can be obtained.

A first exemplary embodiment of the present invention will be described below. According to the first exemplary embodiment, a plurality of failure detection units to detect a plurality of kinds of failures is provided, and different contents corresponding to the failure detection units are displayed on the display units.

Figure 4:
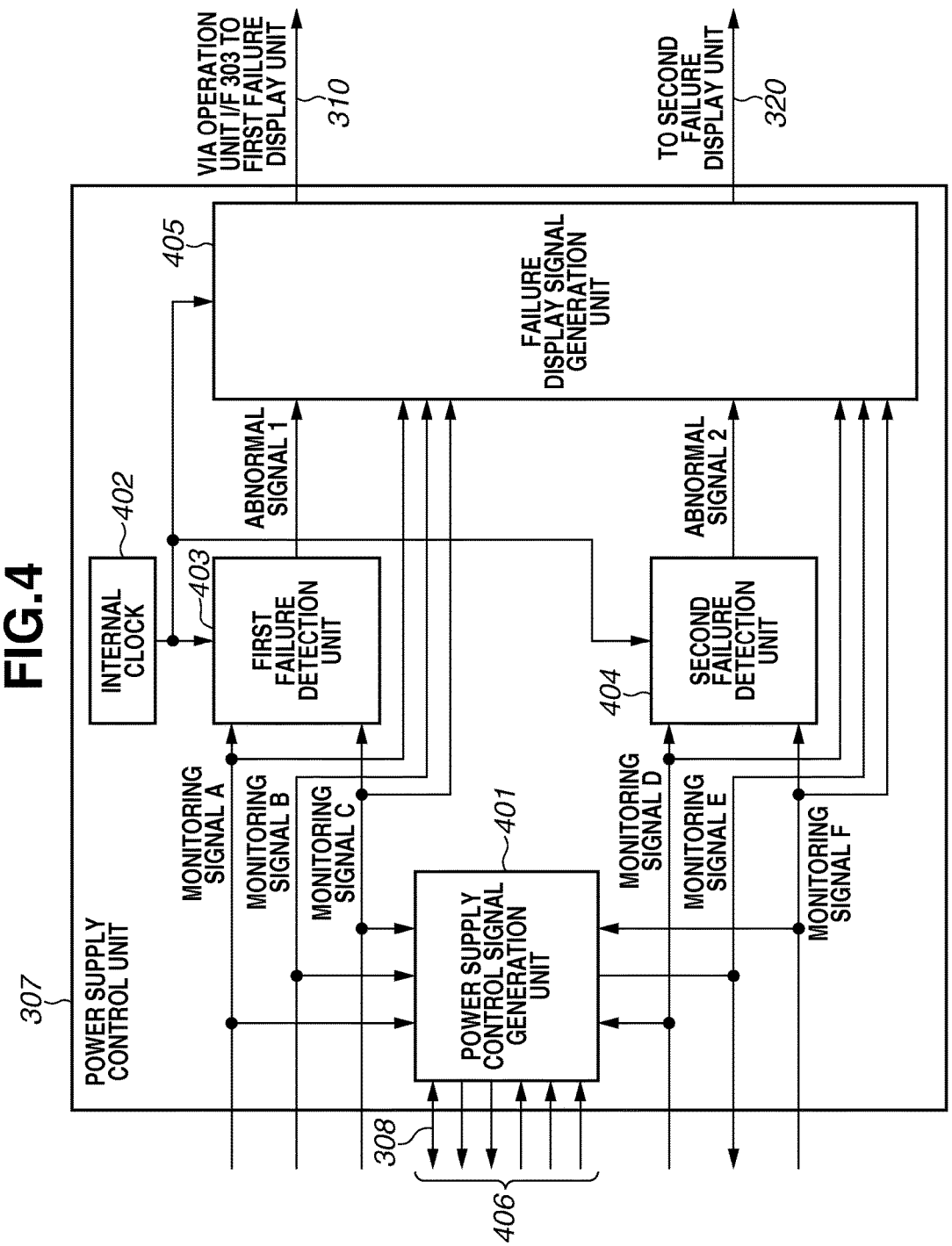
FIG. 4 is a block diagram illustrating a configuration of a power supply control unit according to an exemplary embodiment of the present invention.

FIG. 4 is a block diagram illustrating a configuration of the power supply control unit 307 according to the first exemplary embodiment.

A power supply control signal generation unit 401 controls power supply of systems, such as on/off of the second power supply 207 and the second local power supply unit 306 in the above-mentioned power-saving mode. The power supply control signal generation unit 401 is connected with monitoring signals A to F, a system bus 308, which the CPU 302 accesses when the CPU 302 starts, and an input/output signal group 406.

A first failure detection unit 403 and a second failure detection unit 404 monitor signals used in the power supply control signal generation unit 401, and detect a failure. A specific method for detecting a failure will be described below. When the first failure detection unit 403 or the second failure detection unit 404 detects a failure, the first failure detection unit 403 or the second failure detection unit 404 outputs an abnormal signal 1 or an abnormal signal 2 respectively to a failure display signal generation unit 405. When the abnormal signal 1 or 2 is input into the failure display signal generation unit 405 which receives the monitoring signals A to F, the failure display signal generation unit 405 outputs a failure display signal in a form suitable for the first failure display unit 209 and the second failure display unit 309. The failure display signal generation unit 405 outputs such signals based on the states of the monitoring signals A to F at the time of the input.

The display signal 310 for the first failure display unit 209 is transmitted to the first failure display unit 209 in the operation unit 201 via the system bus 308 and the operation unit I/F 303, and brief information about the failure is displayed. The display signal 320 for the second failure display unit 309 is transmitted to the adjacent second failure display unit 309, and detailed information about the failure is displayed.

An internal clock generation unit 402 provided in the power supply control unit 307 generates a drive clock signal separately from the system clock generation unit 314 to drive the first failure detection unit 403, the second failure detection unit 404, and the failure display signal generation unit 405. The first failure detection unit 403, the second failure detection unit 404, and the failure display signal generation unit 405 use the drive clock signal different from the signal for the power supply control signal generation unit 401. This enables the apparatus to detect a failure and display information about the failure even when the system clock generation unit 314, which is controlled by the CPU 302, is not operating due to a failure in the CPU or the like.

As described above, according to the first exemplary embodiment, the power supply control unit 307 includes therein apart that controls the power supply and a part that detects a failure and generates a display signal. This configuration makes wiring for signals necessary for the failure detection simple and compact, and increases the reliability in the failure detection.

In a specific configuration, for example, a one-chip programmable integrated circuit (IC) can be employed as the power supply control unit 307. If the internal clock generation unit 402 incorporated in the programmable IC is utilized as a CPU-independent internal clock, a drive clock signal can be less affected by peripheral external factors and highly reliable. Further, the signal wires necessary for the failure detection are connected in advance within the IC. Accordingly, the signal wires are free from influence caused by, for example, defective solder joints in a post-process, and thus, the reliability in the failure detection can be increased.

Figure 5:
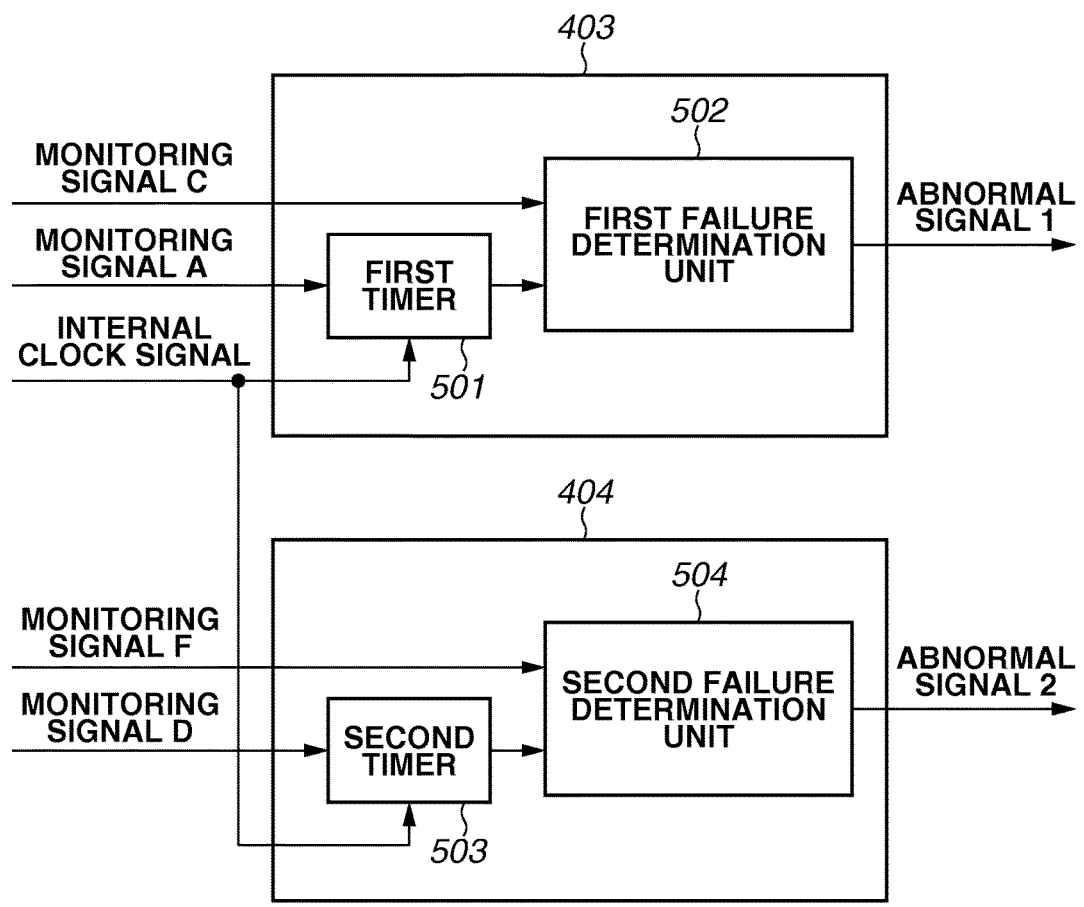
FIG. 5 is a block diagram illustrating a configuration of a failure detection unit in the power supply control unit.

FIG. 5 is a block diagram illustrating a configuration of the first failure detection unit 403 and the second failure detection unit 404. The first failure detection unit 403 starts a first timer 501 when the monitoring signal A changes to be active. The first timer 501 operates with the clock signal generated by the internal clock generation unit 402. When a predetermined time period has passed from the start, the first timer 501 outputs a signal to notify a first failure determination unit 502 that the predetermined time has passed.

The first failure determination unit 502 is connected with a line of the monitoring signal C to which the monitoring signal C captured within a predetermined time is input. If the monitoring signal C is not captured by the time when the first timer 501 notifies that the predetermined time has elapsed, the first failure determination unit 502 outputs an abnormal signal 1, and transmits the detection of the failure to the failure display signal generation unit 405.

If the monitoring signal C is captured within the predetermined time, the first failure determination unit 502 determines that the operation is normal and does not output the abnormal signal 1.

It is desirable that the monitoring signal A, which is a trigger for starting the first timer 501, changes at the time of the start of a series of CPU boot-up processing. Moreover, it is desirable that the monitoring signal C, which should be captured by the time the timer count of the predetermined time period is completed, indicates the completion of a series of CPU boot-up processing.

The second failure detection unit 404 has a configuration similar to that of the first failure detection unit 403, in which only the monitoring signals are different. By using these two failure detection units, two kinds of abnormal conditions can be detected, and thus the identification of the failure locations is very easy. For example, the first failure detection unit 403 can be applied to the failure detection of the components which are activated by the first power supply 205, and the second failure detection unit 404 can be applied to the failure detection of the components which are activated by the second power supply 207. By dividing targets of the failure detection in such a manner, failure location is easily identified. In this exemplary embodiment, once the first power supply 205 is started at the time of power supply, the first power supply keeps the turn-on state. On the other hand, the second power supply 207 is turned off when the apparatus enters the power-saving mode, and is turned on when the apparatus returns to the normal mode. That is, the second power supply 207 repeats the on-off operation. Consequently, it is reasonable to divide the failure detection circuits.

FIG. 5 illustrates the specific configuration of the failure detection having the two failure detection units. In FIG. 5, a first Power-Good signal 316 can be connected as the monitoring signal A for the first failure detection unit 403, as an example. The first Power-Good signal 316 is output by the first local power supply unit 315 when the outputs of the 3.3 V power supply, the 1.8 V power supply, and the 1.0 V power supply reach their respective predetermined voltages. This stabilizes the first local power supply output and also starts failure detection.

As the monitoring signal B, the power supply control clock signal 319 is used. The monitoring signal C is the power-saving mode/normal mode switching signal 313 output from the system power supply control unit 317 of the CPU 302. These three monitoring signals sequentially start operations.

In a normal state, the first local power supply 315 starts output, and sequentially, the power supply control clock signal 319 starts the oscillation within a predetermined period of time. Then, the power-saving mode/normal mode switching signal 313 is output. In such a case, it is determined that the operation is normal, and the abnormal signal 1 is not output.

On the other hand, if there is a failure, the sequence stops in the middle of the processing, so that it is determined that the operation is abnormal. Consequently the abnormal signal 1 is output.

It is desirable to employ the power-saving mode/normal mode switching signal 313 as the monitoring signal D for the second failure detection unit 404. The monitoring signal E is the power supply control signal 208 that turns on the second power supply 207. As the monitoring signal F, the second Power-Good signal 312 which is output from the second local power supply unit 306 is used. These three monitoring signals sequentially start operations.

In a normal state, after the switching signal 313 is output, the power supply control unit 307 sequentially outputs the power supply control signal 208 within a predetermined period of time. Then, the second power-good signal is output shortly after the second local power supply 306 starts the output. In such a case, it is determined that the operation is normal, and the abnormal signal 2 is not output.

On the other hand, if there is an apparatus failure, the sequence stops in the middle of the processing, and then, it is determined that the operation is abnormal. Consequently, the abnormal signal 2 is output.

FIG. 6 illustrates an example of the signal wave forms relating to the first failure detection unit 403 and the second failure detection unit 404, and illustrates a case where all monitoring signals are normal.

In response to the output (event A) of the monitoring signal A, the first timer 501 starts counting.

Then, the monitoring signal B is output (event B). Although this signal is not directly used for the failure detection, the signal is output to the failure display signal generation unit 405 at the time of failure detection to locate the detected failure spot. While the signal that is not directly used for the failure detection is utilized in this exemplary embodiment, a plurality of monitoring signals can be similarly utilized.

Next, if the operation is normal, the monitoring signal C is output (event C). Then, the first timer 501 counts a predetermined time period T1, and outputs a timer output. By this time, if the monitoring signal C has been output, it is determined that the operation is normal, and if the monitoring signal C has not been output, it is determined that the operation is abnormal.

The monitoring signals A to C are to be sequentially output, and if the monitoring signal B is not output, the monitoring signal C is not output as well. Consequently, when the monitoring signal C is not output, two abnormal cases are possible: the monitoring signal B as well as the monitoring signal C is not output, or only the monitoring signal C is not output. Consequently, as described above, the monitoring signal B can be utilized to locate the failure.

The relationship between the monitoring signals of the first failure detection unit 403 and the operation has been described above. The relationship between the monitoring signals of the second failure detection unit 404 and the operation is similar to the above-described relationship.

In response to the output (event D) of the monitoring signal D, the second timer 503 starts counting. Then, the monitoring signal E is output (event E). Although this signal is not directly used for the failure detection, the signal can be utilized to locate the failure by the failure display signal generation unit 405 at the time of failure detection. Next, if the operation is normal, the monitoring signal F is output (event F). Subsequently, when the second timer 503 counts a predetermined time period T2, a timer output is provided. By this time, if the monitoring signal F has been output, it is determined that the operation is normal, and if the monitoring signal F has not been output, it is determined that the operation is abnormal.

The monitoring signals D to F are to be sequentially output, and if the monitoring signal E is not output, the monitoring signal F is not output as well. Accordingly, when the monitoring signal F is not output, two abnormal cases are possible: the monitoring signal E is not output as well as the monitoring signal F, or only the monitoring signal F is not output.

While the simple signal outputs have been described as the events illustrated in FIG. 6, more complicated events can be employed. For example, events such as a clock oscillation start, or whether there is access to a read signal of a memory can be utilized as the monitoring signals.

Figure 7A:
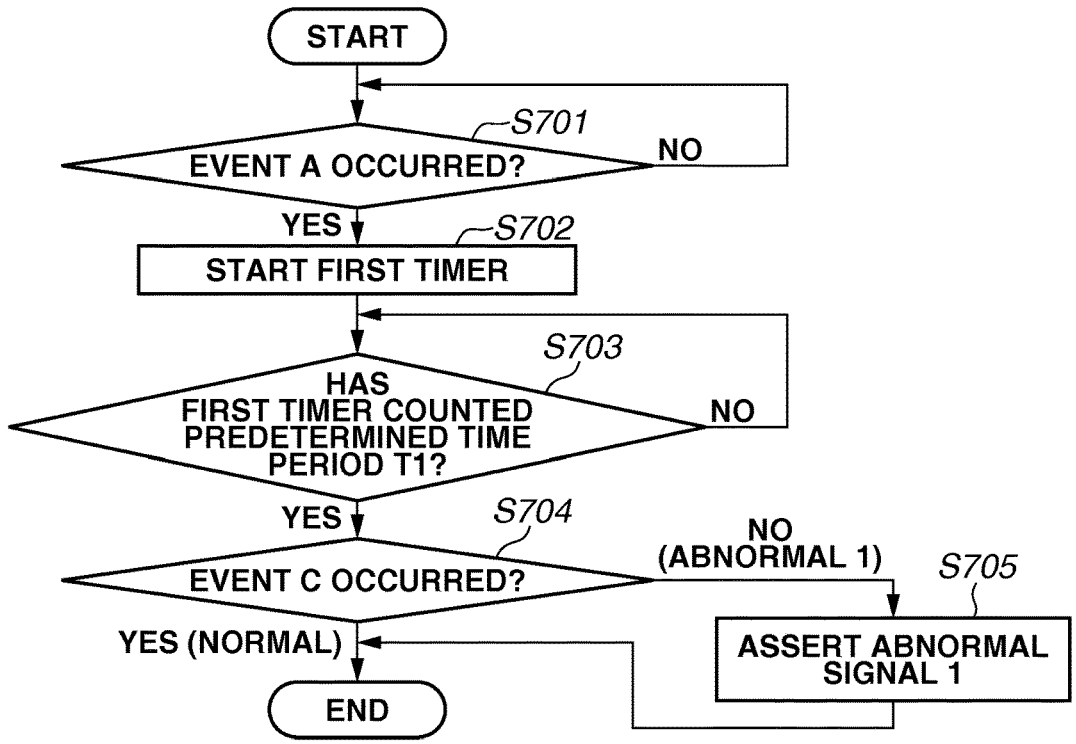
FIG. 7A and FIG. 7B are flowcharts illustrating processing for failure detection in the failure detection unit.

FIG. 7A is a flowchart illustrating the processing for failure detection in the first failure detection unit 403. In step S701, the first failure detection unit 403 waits for the occurrence of the event A. When the event A has occurred (YES in step S701), then in step S702, the first failure detection unit 403 starts the first timer 501 using the occurrence of event A as a trigger. In step S703, the first failure detection unit 403 waits until the first timer 501 has completed the count of the predetermined time period T1. After the time period T1 has passed (YES in step S703), in step S704, the first failure detection unit 403 checks whether the event C has occurred. If the event C has occurred (YES in step S704), the processing normally ends. If the event C has not occurred (NO in step S704), then in step S705, the first failure detection unit 403 outputs the abnormal signal 1 and ends the processing.

Figure 7B:
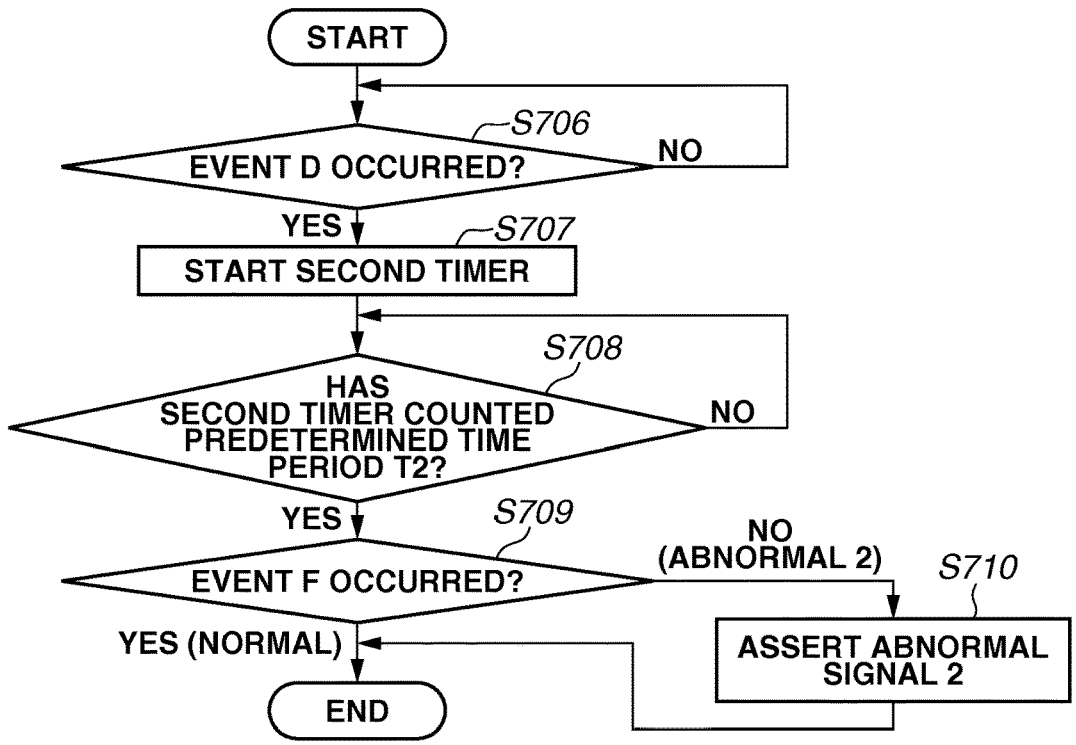

FIG. 7B is a flowchart illustrating the processing for failure detection in the second failure detection unit 404. In step S706, the second failure detection unit 404 waits for the occurrence of the event D. When the event D has occurred (YES in step S706), then in step S707, the second failure detection unit 404 starts the second timer 503 using the occurrence of the event D as a trigger. In step S708, the second failure detection unit 404 waits until the second timer 503 has completed the count of the predetermined time period T2. After the time period T2 has passed (YES in step S708), then in step S709, the second failure detection unit 404 checks whether the event F has occurred. If the event F has occurred (YES in step S709), the processing normally ends. If the event F has not occurred (NO in step S709), then in step S710, the second failure detection unit 404 outputs the abnormal signal 2 and ends the processing.

FIG. 8 is a block diagram illustrating a configuration of the failure display signal generation unit 405.

A first latch unit 801 retains information about the present states of the monitoring signals A to C at the time the abnormal signal 1 is output. Since the states of the signals may change after failure detection, it is desirable to store the individual signal levels of the monitoring signals in the first latch 801 to prevent variations and fluctuations in the failure display contents.

The latched signal the level of which has been maintained by the first latch unit 801 is input in a table conversion unit 803. The signal is then converted into an error signal, which indicates a failure type to be displayed, according to a combination of the states of the input signals.

Similarly, the signal latched by a second latch unit 802 of the second failure detection unit 404 is input into the table conversion unit 803. The table conversion unit 803 includes a conversion table for the first failure display unit 209 and a conversion table for the second failure display unit 309, each of which corresponds to the first failure display unit 209, which displays brief information, and the second failure display unit 309, which displays detailed information, respectively.

The operation contents of a first blink generation circuit 804 will be described below. The signals A, B, and C latched in the first latch unit 801 are, depending on individual combinations of active and inactive, converted into a predetermined error signal 1 and a predetermined error signal 2 with the conversion table (the contents are illustrated in the correspondence conversion table illustrated in FIG. 9A) for the first failure display unit 209 of the table conversion unit 803. The signals are then transmitted to the first blink generation circuit 804, and a blink pattern signal corresponding to the contents of the failure error signals 1 and 2 is generated. Then the signal is output to the first failure display unit 209.

The operation contents of a second blink generation circuit 805 are similar to those of the first blink generation circuit 804. The signals D, E, and F latched by the second latch unit 802 are, depending on individual combinations of active and inactive, converted into a predetermined error signal 3 and a predetermined error signal 4 with the conversion table (the contents are illustrated in the correspondence conversion table in FIG. 9B) for the second failure display unit 309 via the table conversion unit 803. The signals are transmitted to the second blink generation circuit 805, and a blink pattern signal corresponding to the contents of the failure error signals 3 and 4 is generated. Then the signal is output to the second failure display unit 309.

The first failure display unit 209 for displaying brief information of the failure types includes, for example, one light-emitting diode (LED), which can represent a plurality of failure types with blinking patterns or frequencies.

The second failure display unit 309 for displaying detailed information of the failure contents can include a plurality of LEDs having different colors which can be turned on and off, blinked with various blinking patterns, and frequencies. In this manner, further subdivided and detailed failure information can be displayed.

FIG. 9A is a specific example of the correspondence conversion table for the first failure display unit 209, which is described above. The first latch unit outputs the latch signals A and B. If the latch signal A is active, and the latch signal B is inactive, it is determined that the failure is caused by the latch signal B not being output. Then, the error signal 1 is set to active and the error signal 2 is set to inactive, and the signals are transmitted to the first blink generation circuit 804. The first blink generation circuit 804 generates a blink pattern 1, accordingly.

Similarly, if the latch signal A is active, the latch signal B is active, and the latch signal C is inactive, all of which are output from the first latch unit 801, it is determined that the failure is caused by the latch signal C not being output. Then, the error signal 1 is set to inactive and the error signal 2 is set to active, and the signals are transmitted to the first blink generation circuit 804. The first blink generation circuit 804 generates a blink pattern 2, accordingly.

If all of the latch signals A, B, and C are active, all of which are output from the first latch unit 801, it is determined that the operation is normal. Then, both of the error signal 1 and the error signal 2 are set to inactive, and the signals are transmitted to the first blink generation circuit 804. The first blink generation circuit 804 outputs "TURN OFF LIGHT" signal, accordingly FIG. 9B is a specific example of the correspondence conversion table for the second failure display unit 309. If the latch signal D is active, and the latch signal E is inactive, which are the output of the second latch unit 802, it is determined that the failure is caused by the latch signal E not being output. Then, the error signal 3 is set to active and the error signal 4 is set to inactive, and the signals are transmitted to the second blink generation circuit 805. The second blink generation circuit 805 generates a blink pattern 3, accordingly.

Similarly, if the latch signal D is active, the latch signal E is active, and the latch signal F is inactive, all of which are the output of the second latch unit 802, it is determined that the failure is caused by the latch signal F not being output, and the signals are transmitted to the second blink generation circuit 805. Then, the second blink generation circuit 805 generates a blink pattern 4.

If all of the latch signals D, E, and F, all of which are the output of the first latch unit 802, are active, it is determined that the operation is normal. Then, both of the error signals 3 and 4 are set to inactive, and the signals are transmitted to the second blink generation circuit 805. The second blink generation circuit 805 outputs "TURN OFF LIGHT" signal, accordingly.

As described above, according to the first exemplary embodiment, the two failure detection units and the two failure display units are provided, so that two kinds of abnormal conditions can be detected and two kinds of failure displays, that is, brief and detailed information can be displayed. With this configuration, even if the CPU fails to start, the notification of failure can be provided to the service staff and the user, and further, detailed information about the failure location can be provided to the service staff.

Hereinafter, the second exemplary embodiment of the present invention is described. According to the second exemplary embodiment, the apparatus is restarted once when a failure is detected. Then, if the failure is detected again after the restart of the apparatus, the failure is displayed.

In a power supply unit for converting commercial alternating current power supply into direct current power supply, for example, the second power supply 207, overcurrent is often detected due to excessive inrush current when the power is turned on, and then, an operation stop in which the power supply unit fails to output power supply occurs. In the case of the failure due to such a factor, it is not desirable to immediately determine that a failure occurs. This is because the apparatus can be activated normally if such overcurrent does not occur when the apparatus has restarted after the operation is switched from power-off to power-on. If the failure is caused by other factors, the apparatus does not start after the operation is switched from power-off to power-on, and accordingly, the factors of the overcurrent can be distinguished.

Consequently, it is desirable that, when the power supply unit does not start at the first operation from power-off to power-on, it is not immediately determined that a failure has occurred, and failure information is not displayed. If the power supply unit does not start after the second operation from power-off to power-on, it is determined to be a failure, and then, failure information is displayed.

In the second exemplary embodiment, turn-off and turn-on of the second power supply 207 is described in a case where an abnormal condition is detected in the second power supply 207. The second power supply is turned off and turned on at the time of the transition into the power-saving mode and the return from the power-saving mode.

FIG. 10 is a block diagram illustrating a configuration of the power supply control unit 307 according to the second exemplary embodiment. In FIG. 10, as compared with the block diagram (FIG. 4) described in the first exemplary embodiment, it differs in that a first second determination circuit 1001 and a second second determination circuit 1003 are added.

According to the exemplary embodiment, as an example, the second failure detection unit 404 detects a failure occurring in a component that is activated by the second power supply 207.

If the second failure detection unit 404 detects a failure and the second second determination circuit 1003 determines the failure as a "first failure detection", the second second determination circuit 1003 outputs a second restart request signal 1004 to the power supply control signal generation unit 401.

The power supply control signal generation unit 401 receives the second restart request signal 1004 and outputs a power supply control signal to the second power supply 207. In response to the signals, the second power supply 207 is turned off and on. In this processing, no abnormal condition is notified to the failure display signal generation unit 405, and thus, no failure message is displayed.

If the second second determination circuit 1003 determines that the detected failure is a "second failure detection", the second second determination circuit 1003 outputs no second restart request signal 1004, and notifies the failure display signal generation unit 405 of the abnormal condition.

As described above, in this configuration, when the power supply does not start due to overcurrent detection at the time of turn-on of the power supply, no information about abnormal condition is displayed until the power supply is turned off and turned on and a failure is detected again.

Similarly, as for the first power supply 205, the first second determination circuit 1001 can output a restart request signal 1002 to restart the first power supply 205.

FIG. 11 is an example of signal waveforms relating to the first failure detection unit according to the second exemplary embodiment.

Compared with the waveforms (FIG. 6) in the first exemplary embodiment, FIG. 11 differs in that when the second timer 503 that has started counting in response to the output of the monitoring signal D counts up the predetermined time, the abnormal signal 2 is not output, even if the monitoring signal F has not been output, as long as it is the first time. A second restart request signal is output to the power supply control signal generation unit 401, and the second power supply 207 is restarted by a power supply control signal output from the power supply control signal generation unit 401.

After the restart of the second power supply 207, when the second timer 503 that has started to count the predetermined time in response to the output of the monitoring signal D completes counting the predetermined time, if the monitoring signal F has not been output, it is determined that the malfunction corresponds to the second failure detection, and then, the abnormal signal 2 is output.

As described above, according to the second exemplary embodiment, when the power supply does not start due to overcurrent, no failure information is displayed, and the power supply is turned off and turned on. If the power supply does not start when the second power supply is turned from off to on for the second time, failure information is displayed. With this configuration, unnecessary failure display can be eliminated and an unnecessary visit of a service staff can be prevented.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-126497, filed Jun. 19, 2014, which is hereby incorporated by reference herein in its entirety.

What is claimed is:

1. An information processing apparatus comprising:
    a processor;
    a first light emitter;
    a first power supply unit which supplies power to the processor and outputs a first monitoring signal in a case where a voltage of the power supplied from the first power supply unit has exceeded threshold; and
    an integrated circuit which receives the first monitoring signal output from the first power supply unit and a second monitoring signal output from the processor, and, in a power on process of the information processing apparatus, outputs a first failure signal in a case where a time period that elapses without receiving the second monitoring signal after receiving the first monitoring signal is greater than a predetermined time period;
    wherein, in a case where the first failure signal has been output from the integrated circuit, the first light emitter enters a predetermined light emission state which notifies a person of an occurrence of an abnormality of the processor in the power on process.

2. The information processing apparatus according to claim 1, wherein the integrated circuit controller is provided separately from the processor.

3. The information processing apparatus according to claim 1, wherein the first light emitter blinks in the case where the first failure signal has been output from the integrated circuit.

4. The information processing apparatus according to claim 1, further comprising an operation unit which includes a display and receives a user operation,
    wherein the first light emitter is provided to the operation unit.

5. The information processing apparatus according to claim 1, further comprising:
    a second power supply unit; and
    a second light emitter;
    wherein the integrated circuit further receives a third monitoring signal from the second power supply unit and, in the power on process, outputs a second failure signal in a case where a time period that elapses without receiving the third monitoring signal after receiving the second monitoring signal is greater than a predetermined time period, and
    wherein the second light emitter enters a predetermined light emission state in a case where the second failure signal has been output from the integrated circuit.

6. The information processing apparatus according to claim 5, wherein the second power supply unit is a direct current to direct current (DC-to-DC) converter.

7. The information processing apparatus according to claim 5, further comprising a printer which prints an image on a sheet,
    wherein the second power supply unit supplies power to the printer.

8. The information processing apparatus according to claim 5, wherein the second light emitter is provided to a circuit board to which the processor is provided.

9. The information processing apparatus according to claim 1, wherein the processor is a main central processing unit (CPU) of the information processing apparatus.

10. The information processing apparatus according to claim 1, wherein the first power supply unit is a direct current to direct current (DC-to-DC) converter.

11. The information processing apparatus according to claim 1, further comprising a printer which prints an image on a sheet.

12. The information processing apparatus according to claim 1, wherein the first light emitter is turned off in a case where the time period has elapsed without receiving the first monitoring signal.

13. The information processing apparatus according to claim 1, further comprising a clock signal output circuit which outputs a clock signal to the processor,
    wherein the processor outputs the second monitoring signal based on the clock signal.

14. The information processing apparatus according to claim 1,
    wherein the integrated circuit further receives a fourth monitoring signal output from the processor and further outputs a third failure signal based on a time period that elapses without receiving the fourth monitoring signal after receiving the first monitoring signal, and
    wherein the first light emitter enters other light emission state based on the third failure signal.

15. A fault diagnosis method for an information processing apparatus comprising a power supply unit which outputs a first monitoring signal and a processor which is capable of controlling display on a display screen included in the image processing apparatus and which outputs a second monitoring signal, the method comprising:

outputting, by an integrated circuit different from the power supply unit and the processor, a first failure signal, in a power on process of the information processing apparatus, in a case where a time period that elapses without receiving the second monitoring signal after receiving the first monitoring signal is greater than a predetermined time period; and changing a light-emitting state of a light emitter different from the display screen, in a case where the first failure signal has been output, to a predetermined light emission state which notifies a person of an occurrence of an abnormality of the processor in the power on process.

* * * * *